US009703740B2

(12) United States Patent
Gardiner et al.

(10) Patent No.: US 9,703,740 B2
(45) Date of Patent: *Jul. 11, 2017

(54) OPAQUE BRIDGE FOR PERIPHERAL COMPONENT INTERCONNECT EXPRESS BUS SYSTEMS

(71) Applicant: NATIONAL INSTRUMENTS CORPORATION, Austin, TX (US)

(72) Inventors: Eric R. Gardiner, Leander, TX (US); Jonathan W. Hearn, Austin, TX (US); Craig S. Jones, Austin, TX (US); Jason D. Tongen, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,686

(22) Filed: Mar. 8, 2016

(65) Prior Publication Data

US 2016/0188518 A1 Jun. 30, 2016

Related U.S. Application Data

(63) Continuation of application No. 13/918,611, filed on Jun. 14, 2013, now Pat. No. 9,286,258.

(51) Int. Cl.
*G06F 9/24* (2006.01)
*G06F 15/177* (2006.01)
(Continued)

(52) U.S. Cl.
CPC ........ *G06F 13/4045* (2013.01); *G06F 9/4401* (2013.01); *G06F 13/16* (2013.01); *G06F 13/4022* (2013.01); *G06F 13/4068* (2013.01); *G06F 13/4282* (2013.01); *G06F 12/0246* (2013.01); *G06F 13/00* (2013.01); *G06F 13/36* (2013.01); *G06F 13/385* (2013.01);
(Continued)

(58) Field of Classification Search
CPC .............. G06F 12/0246; G06F 13/385; G06F 2213/0026; G06F 13/00; G06F 13/396; G06F 13/4081; G06F 13/4027; G06F 13/4045
USPC ................................................ 713/1, 2, 100
See application file for complete search history.

(56) References Cited

U.S. PATENT DOCUMENTS 6,704,831 B1 3/2004 Avery
6,823,418 B2 11/2004 Langendorf
(Continued)

*Primary Examiner* — Michael J Brown
(74) *Attorney, Agent, or Firm* — Meyertons Hood Kivlin Kowert & Goetzel, P.C.; Jeffrey C. Hood

(57) ABSTRACT

A host system may couple to a PCIe subsystem. During setup of the PCIe subsystem, the BIOS in the host system may first be informed that the devices to be coupled are not PCIe devices, and certain amount of memory is required for these devices. The BIOS may therefore not attempt to configure the devices, and may instead allocate the required memory space. When the operating system boots up, it may not attempt to configure the devices, loading a custom driver instead of an existing PCI driver to configure the bus. Once loaded, the custom driver may configure the devices, then inform the OS that there are PCIe devices in the system at the specified addresses, which may cause the OS to load and execute existing PCIe device drivers to operate/use the devices. The proprietary driver may also be used to handle traffic between the PCIe drivers and the OS.

20 Claims, 9 Drawing Sheets

(51) Int. Cl.
*G06F 13/40* (2006.01)
*G06F 9/44* (2006.01)
*G06F 13/16* (2006.01)
*G06F 13/42* (2006.01)
G06F 12/02 (2006.01)
G06F 13/38 (2006.01)
G06F 13/36 (2006.01)
G06F 13/00 (2006.01)

(52) U.S. Cl.
CPC ...... *G06F 13/4027* (2013.01); *G06F 13/4081* (2013.01); *G06F 2213/0026* (2013.01)

(56) References Cited

U.S. PATENT DOCUMENTS

| | | |
|---|---|---|
| 7,039,733 B2 | 5/2006 | Mudusuru |
| 9,286,258 B2 * | 3/2016 | Gardiner ............. G06F 13/4045 |
| 2004/0193706 A1 | 9/2004 | Willoughby |
| 2005/0102474 A1 | 5/2005 | Lakshmanamurthy |
| 2007/0266179 A1 | 11/2007 | Chavan |
| 2012/0047309 A1 | 2/2012 | Natu |
| 2013/0132607 A1 | 5/2013 | Sinha |
| 2013/0145052 A1 | 6/2013 | Aiken |
| 2013/0232279 A1 | 9/2013 | Adar |

* cited by examiner

OPAQUE BRIDGE FOR PERIPHERAL COMPONENT INTERCONNECT EXPRESS BUS SYSTEMS

PRIORITY CLAIM

This application is a continuation of U.S. patent application Ser. No. 13/918,611 titled "Opaque Bridge for Peripheral Component Interconnect Express Bus Systems", filed on Jun. 14, 2013, which is hereby incorporated by reference as though fully and completely set forth herein.

BACKGROUND OF THE INVENTION

Field of the Invention

This invention relates generally to bus interfaces, and, more particularly, to the design of an improved Peripheral Component Interconnect Express Bus interface.

Description of the Related Art

PCI Express (Peripheral Component Interconnect Express, also abbreviated as PCIe), is a high-speed serial computer expansion bus standard offering numerous improvements over the older PCI, PCI-X, and AGP (Accelerated Graphics Port) bus standards. These improvements include higher maximum system bus throughput, lower I/O pin count and a smaller physical footprint, better performance-scaling for bus devices, more detailed error detection and reporting mechanism, and native hot-plug functionality. Conceptually, the PCIe bus is a high-speed serial interconnect bus using shared address/data lines. Accordingly, the PCIe bus differs from the older PCI bus in its bus topology. While PCI uses a shared parallel bus architecture, where the PCI host and all devices share a common set of address/data/control lines, the PCIe bus is based on a point-to-point topology, with separate serial links connecting every device to the root complex (or host). Because of this shared bus topology, access to the older PCI bus is arbitrated (in the case of multiple masters), and limited to one master at a time, in a single direction.

As mentioned above, PCIe devices communicate via a logical connection referred to as an interconnect or a link, which provides a point-to-point communication channel between two PCIe ports, allowing both ports to send/receive PCI-requests (such as configuration read/write, I/O read/write, memory read/write) and interrupts. In a system that uses PCI or PCIe bus, in order for a PCI device to be addressable, the device must first be mapped into the I/O port address space or the memory-mapped address space of the system. The system's firmware/device drivers or the operating system typically program the Base Address Registers (referred to as BARs) to inform the device of its address mapping by writing configuration commands to the PCI controller.

The PCIe eXtensions for Instrumentation (PXI Express)—introduced in 2005 by National Instruments—is one of several electronic instrumentation platforms in current use, and represents a modular instrumentation platform that leverages existing technology to deliver high performance and low cost modular instrumentation. PXI Express is ideally suited for building electronic test-equipment and/or automation systems, and complements the industry standard PCIe with extra features to facilitate electronic testing and data acquisition. PXI Express affords great flexibility in building test equipment and/or automation systems to exact requirements, often fitted with custom software for managing the entire system.

PXI Express was conceived for measurement and automation applications that typically require high-performance and a rugged industrial form-factor. PXI Express also allows for module selection from a large number of vendors, with the modules easily integrating into a single PXI Express system. Overall, PXI Express uses PC-based technology as part of an industry standard governed by the PXI Systems Alliance (PXISA), ensuring standards compliance and system interoperability. PXI Express modules are available for a wide variety of test, measurement, and automation applications, from switching modules to high performance microwave vector signal generation and analysis instruments.

PXI Express modules are typically designed to implement specific functions, such as analog signal capture, RF signal analysis, and/or waveform generation. PXI Express modules that provide instrument functions usually plug into a PXI Express chassis that may include its own controller running an industry standard Operating System (e.g. Windows XP, Windows 2000, and/or Linux), or a PCI Express-to-PXI Express bridge that provides a high-speed link to a desktop PC controller. Similarly, multiple PXI Express racks may be linked together with PCI Express bridges (or bridge cards) to build very large systems such as multiple source microwave signal generator test stands for complex ATE applications.

Many PXI Express chassis solutions may require as many as 26 (twenty-six) PCI bus numbers for a single, unpopulated chassis. Larger multi-chassis applications could easily require over 100 (one hundred) continuous bus numbers. Industry PCI Express systems increasingly support fewer and fewer bus numbers, based on the expectation that a 64-bus maximum configuration will become common. These systems sometimes lack the contiguous bus numbers needed to support even a single, large PXI chassis.

Other corresponding issues related to the prior art will become apparent to one skilled in the art after comparing such prior art with the present invention as described herein.

SUMMARY OF THE INVENTION

There are conditions under which it may not be possible to construct a desired system using a PCIe bus (i.e. PCIe switch fabric), as there may not be enough bus numbers available. There are typically eight (8) bits available for setting bus numbers in a PCIe switch fabric, which may lead to compatibility problems. Moving downstream from a host, the number (m) assigned to a given bus is expected to be greater than the number (n) assigned to a bus upstream from the given bus in the switch fabric. For example, if the bus number of a bus connecting a host to a bridge is '1', then the bus number of a bus connecting the bridge to a downstream device is expected to be greater than '1', such as '2' or '3', etc. The bus/bridge may also have a corresponding bus number range indicating the number of downstream buses. There may be situations in which the bus number range may need to be reset to make enough bus numbers available to construct the desired system. Thus, a mechanism may be established to reset 'm' to 0, for example.

A special piece of hardware may facilitate the introduction of a discontinuity in the bus numbers. Since, under normal conditions, the discontinuity prevents the system from operating properly by virtue of breaking the routing mechanism, the HW may be operated in a manner that ensures that the system functions properly, even as the discontinuity is introduced. A system and method may also be implemented to translate the BDFs (bus device functions) during operation, in a manner that ensures that the bus configuration also remains fully functional, and the host remains unaware of any changes that may have been made in the physical subsystem. In one set of embodiments, a mechanism may be established to route PCIe packets based on packet type in addition to routing the packets according to address information that may be included in the packet. By routing the packets based on packet type, it becomes possible to couple a host to a PCIe subsystem requiring more bus numbers than provided for in a standard PCIe switch fabric configuration.

In one set of embodiments, a host system may couple to a PCIe subsystem. During setup of the PCIe subsystem, the BIOS in the host system may first be informed that the devices to be coupled are not PCIe devices, and certain amount of memory is required for these devices. The BIOS may therefore not attempt to configure the devices, and may instead allocate the required memory space. When the operating system boots up, it may not attempt to configure the devices, loading a custom driver instead of an existing PCI driver to configure the bus. Once loaded, the custom driver may configure the devices, then inform the OS that there are PCIe devices in the system at the specified addresses, which may cause the OS to load and execute existing PCIe device drivers to operate/use the devices. The proprietary driver may also be used to handle traffic between the PCIe drivers and the OS.

In another set of embodiments, a system may include a PCIe subsystem that includes PCIe devices, and a host coupled to the PCIe subsystem. During setup of the PCIe subsystem, the host may load custom driver software corresponding to a non-PCI bus protocol, and configure the PCIe devices according to the custom driver SW instead of configuring the PCIe devices according to PCI bus driver software. Subsequent to the setup of the PCIe subsystem, the host may load existing PCIe device drivers to operate the PCIe devices. The host may execute a BIOS during setup of the PCIe subsystem, whereby the BIOS is informed that the PCIe devices to be coupled to the host are not PCIe devices, and is further informed how much memory is required by the PCIe devices to be coupled. The BIOS may allocate the required memory to the PCIe devices accordingly. The host may load the custom driver SW as well as the PCIe device drivers while executing the OS.

Pursuant to the above, a system may include a processing element, and a memory that stores first driver software corresponding to a non-PCI bus protocol, and executable by the processing element during setup of a PCIe subsystem that includes PCIe devices to be connected to and operated by a host system. The memory element may also store PCIe device driver software executable by the processing element subsequent to the setup of the PCIe subsystem. The processing element may execute the first driver software to configure the PCIe devices, and it may execute the PCIe driver software to operate the PCIe devices. The processing element and the memory may both be part of the host system. The memory may also store BIOS software executable by the processing element during the setup of the PCIe subsystem to preallocate specified resources associated with the PCIe subsystem, prior to the processing element executing the first driver software. The processing element may further execute the first driver software to use the preallocated specified resources to configure memory requirements for the PCIe devices. In one embodiment, the system further includes a bus extender that couples the PCIe subsystem to the host system, and appears to the processing element as a bridge to a bus of unknown type. The bus extender may include a configuration space register that stores a list of resource requests intended for the processing element, and when executing the BIOS software to preallocate the specified resources to the bus extender, the processing element may preallocate the specified resources according to the list of resource requests stored in the configuration space register.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
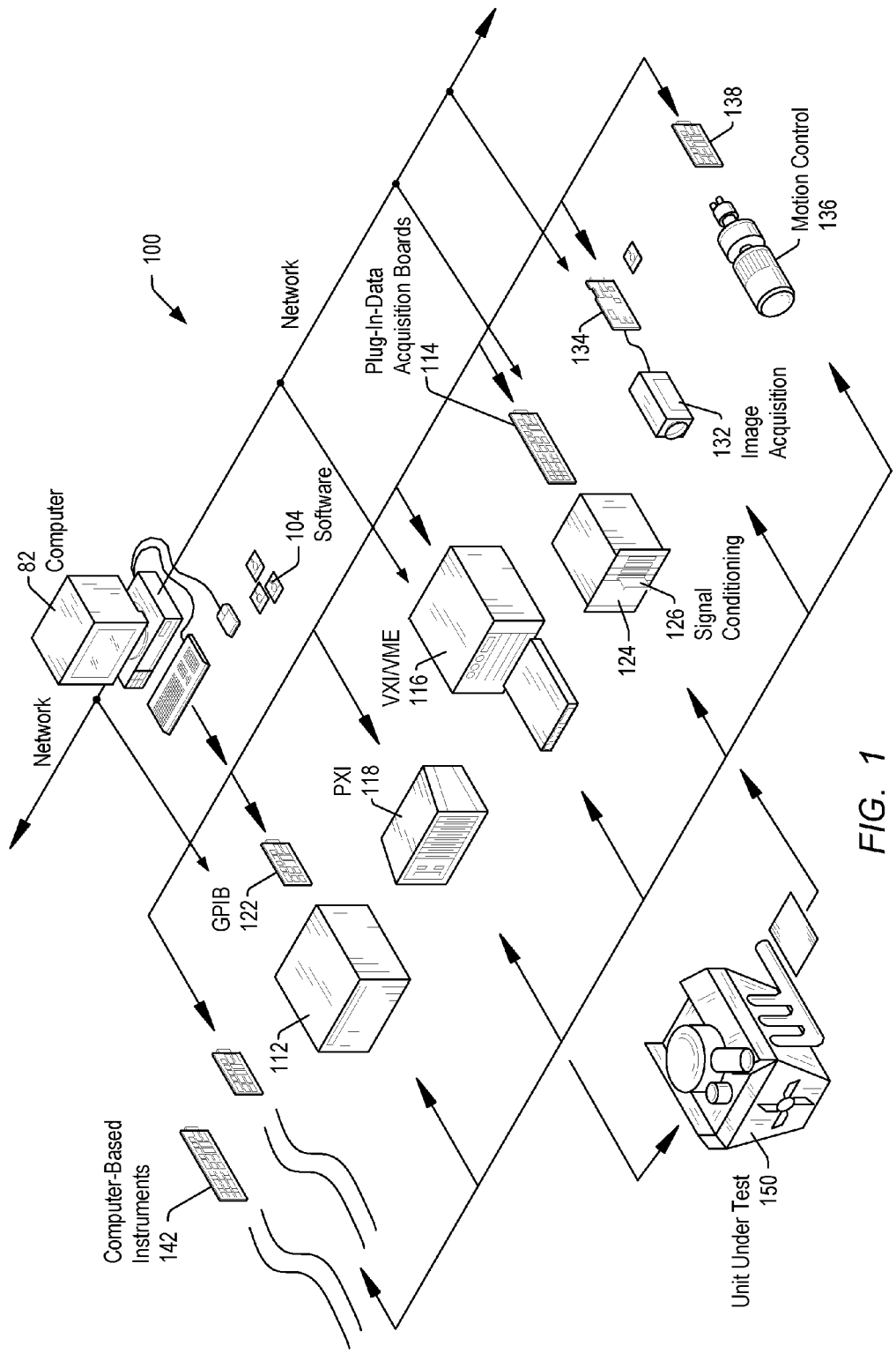
FIG. 1 shows an instrumentation control system with instruments networked together according to one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

FIG. 1 illustrates an exemplary instrumentation control system 100 which may be configured according to embodiments of the present invention. System 100 comprises a host computer 82 which may couple to one or more instruments configured to perform a variety of functions using timing control implemented according to various embodiments of the present invention. Host computer 82 may comprise a CPU (Central Processing Unit), a display screen, memory, and one or more input devices such as a mouse or keyboard as shown. Computer 82 may operate with one or more instruments to analyze, measure, or control a unit under test (UUT) or process 150. The one or more instruments may include a GPIB (General Purpose Interface Bus) instrument 112 and associated GPIB interface card 122, a data acquisition board 114 inserted into or otherwise coupled with chassis 124 with associated signal conditioning circuitry 126, a VXI (VERSAmodule Eurocard [VME] eXtensions for Instrumentation) instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the UUT or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
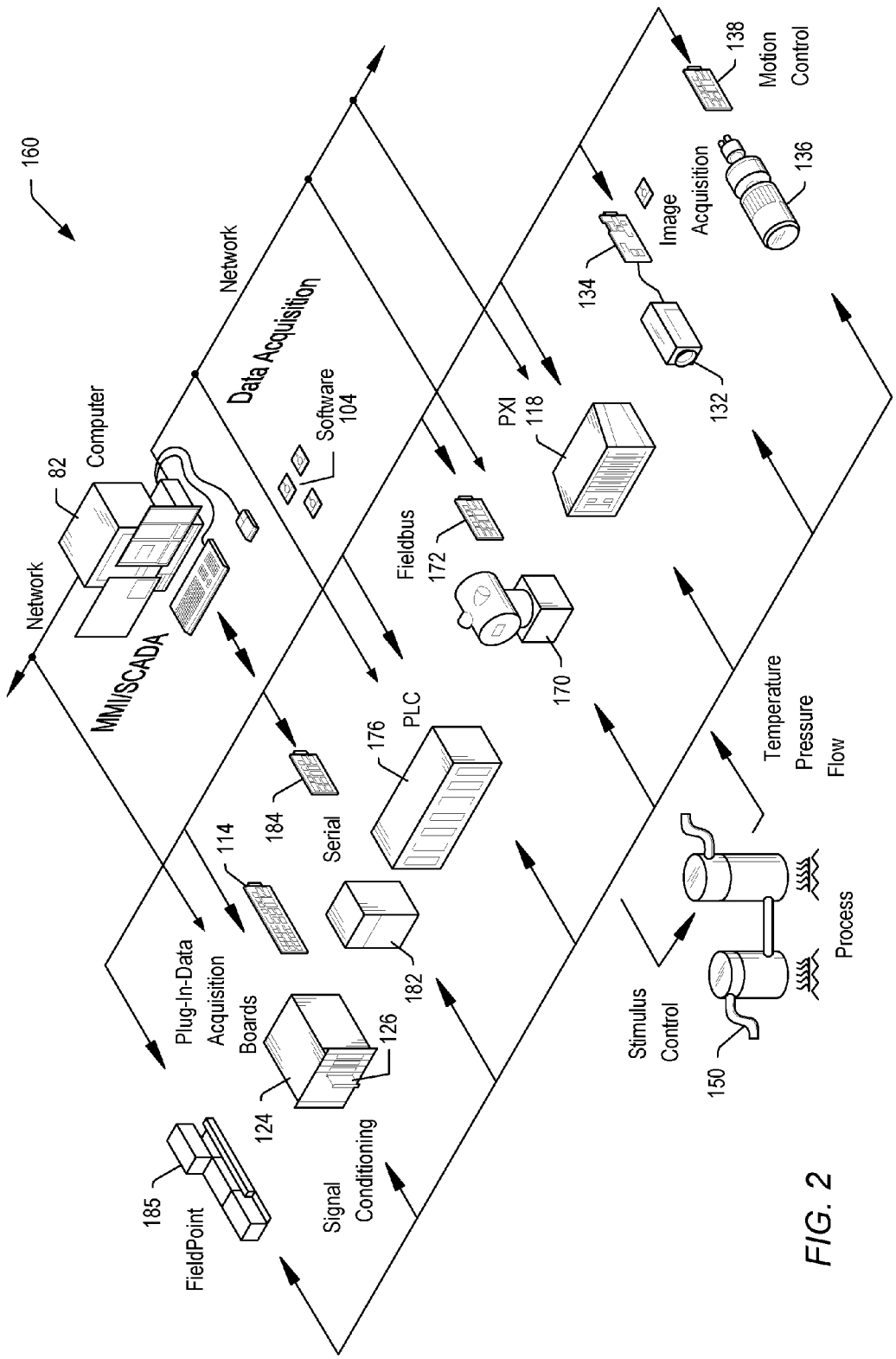
FIG. 2 shows an industrial automation system with instruments networked together according to one embodiment of the invention.

FIG. 2 illustrates an exemplary industrial automation system 160 that may be configured according to embodiments of the present invention. Industrial automation system 160 may be similar to instrumentation or test and measurement system 100 shown in FIG. 1. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection, which may facilitate running a high-level synchronization protocol between the computer system and the coupled instruments/devices.

As seen in FIG. 1 and FIG. 2, system 100 and/or system 160 may include one or more chassis or plug-in boards that use a PCIe (or PXI) bus to couple one or more of a variety of different devices or functions which may interact with the host or host computer. As previously mentioned, PCI Express is point-to-point packet protocol, which appears in the system as a bus that couples together PCI devices. Therefore, any read and/or write operations initiated by a programmer to a PCI device on a PCIe bus are expected to look the same. Transactions that occur on the PCIe topology are expected to work out the same as if they had been executed on a conventional PCI bus. Accordingly, there is oftentimes a need to transparently route the packets representing read and write transactions to the proper, i.e. intended device. Operations are expected to be initiated from/by a bus master, and packets are expected to arrive at their proper destinations. There are a number of packet types and a number of routing mechanisms in PCIe.

When programming for a PCIe bus, the SW (software) is typically configured as if a PCI bus were in use. Based on an address range, the PCIe topology is expected to determine which device a given packet is intended for. Therefore, an address routing protocol is implemented by the various switches in the topology. Responses to reads are not address based, rather they are routed back to the originator. One of the routing mechanisms in PCIe is BDF (bus device function) routing. BDF is representative of the respective addresses of the devices in the PCIe system. Read responses are routed back to the respective originators, using the BDF, and the originators place their respective BDFs in the packet. However, BDF based routing may pose a problem under certain conditions.

There are rules that determine how the buses are numbered as part of the switch fabric of PCIe. In the PCIe switch fabric, device numbers are typically '0' for each device, while the buses interconnecting the devices are numbered. E.g. bus 0, bus 1, bus 2, etc. In certain configurations, a bridge may be implementing a fan out to subordinate switches, in which case there is a top level bridge and lower level bridges, where the lower level bridges are numbered 0, 1, 2, etc., while all devices downstream from a given lower level bridge are all numbered '0'. Therefore, the topology comprises mostly bus numbers, which is however not how the original PCI bus structure and protocol were configured. Under certain conditions, there may not be enough bus numbers available to construct the desired system using a PCIe bus (i.e. PCIe switch fabric), as there are typically only eight (8) bits available for setting bus numbers, which may lead to compatibility problems.

Moving downstream from a host, the number (m) assigned to a given bus is always expected to be greater than the number(s) (n) assigned to a bus (or busses) in the switch fabric that appear upstream from the given bus. For example, if the bus number of a bus connecting a host to a bridge is '1', then the bus number of a bus connecting the bridge to a downstream device is expected to be greater than '1', e.g. '2' or '3', etc. In addition to a bus number assigned to a given bus, for example a bus that connects devices downstream from a bridge, the bus/bridge may also have a corresponding bus number range indicating the number of buses downstream. There may be situations in which the bus number range may need to be reset to make available enough bus numbers to construct the desired system. Thus, a mechanism may be established to reset 'm' to 0, for example. One two-step solution may include a special piece of HW (hardware) that may facilitate the introduction of a discontinuity in the bus numbers. Since, under normal conditions, the discontinuity prevents the system from operating properly by virtue of breaking the routing mechanism, the HW is operated in a manner that ensures that the system functions properly, even as the discontinuity is introduced. A system and method may also be implemented to translate the BDFs during operation, in a manner that ensures that the bus configuration also remains fully functional, and the host remains unaware of any changes that may have been made.

An NTB (non transparent bridge) allows discontinuities in the bus numbers, and facilitates coupling two root systems (or independent systems) together. There are a number of varied applications (e.g. memory mappings) available for the NTB to implement the system coupling with discontinuous bus numbering. An NTB facilitates bus numbering that doesn't follow the standard PCIe hierarchical structure, and ensures proper packet routing. However, and NTB alone does not provide a solution when there is a need to attach a subsystem that appears as a proper single PCI subsystem to the host while the bus numbering in the subsystem is reset. An NTB connects two PCI topologies together such that the two topologies appear to each other as peers, and the bridge between them doesn't follow the standard PCIe routing protocols. In effect, the NTB may be considered to be operating as an "arbiter" between the two peer systems.

Another problem is that bus numbering restrictions oftentimes reduce the number of bits available for bus numbering down to 4-5 bits, whereas some chassis plugging into a host system may require a minimum of 5 bits for bus numbering just to be plugged into the system, without any cards having been inserted into the chassis yet. Thus, some bus numbers may need to be hidden from the host to ensure that the chassis is properly plugged into the system.

A bus on which an NT bridge is configured typically has a corresponding respective independent memory address space (separate physical memory space) on either side of the bridge. Typically, at least a portion of the memory address space from one side is mapped to a range of the memory address space on the other side. This mapping may be performed in each direction. Each processor (host) may determine (decide) where the address range from the other system is to reside in its own address space. Thus, two different address ranges may be resolved, effectively creating a window for each processor to access the other processor's memory space. This is typically how NT bridges are used in PCIe systems.

In one set of embodiments, a section of a PCI hierarchy may be altered to map into a PCIe switch fabric while bypassing the aforementioned bus limitations. The packet type of each transmitted packet may be examined and selectively routed according to packet type, and there may be a primary path through which the packets are routed under normal conditions, while certain packets may be routed through a secondary path. The altered hierarchical operation allows rerouting configuration packets for each attached subsystem. In other words, while the bus numbering of the physical subsystem may remain discontinuous (through the introduction of an NTB), the numbering may still appear continuous to the host(s), which may therefore configure the system as a PCI system.

PCIe Packet Routing Based on Packet Types

As mentioned above, PCIe bus expansion products that desire to selectively or completely hide bus complexity from the host typically use an NTB. The NTB isolates the two PCIe bus segments, and translates data used for forwarding message packets. However, currently available NT functions do not route message packets used for implementing legacy interrupts. Bus expansion products without legacy interrupt support are substantially compromised. In one set of embodiments, an improved, expanded bridge is used for providing routing of interrupt messages around an NTB, thereby facilitating legacy interrupt support.

Figure 3:
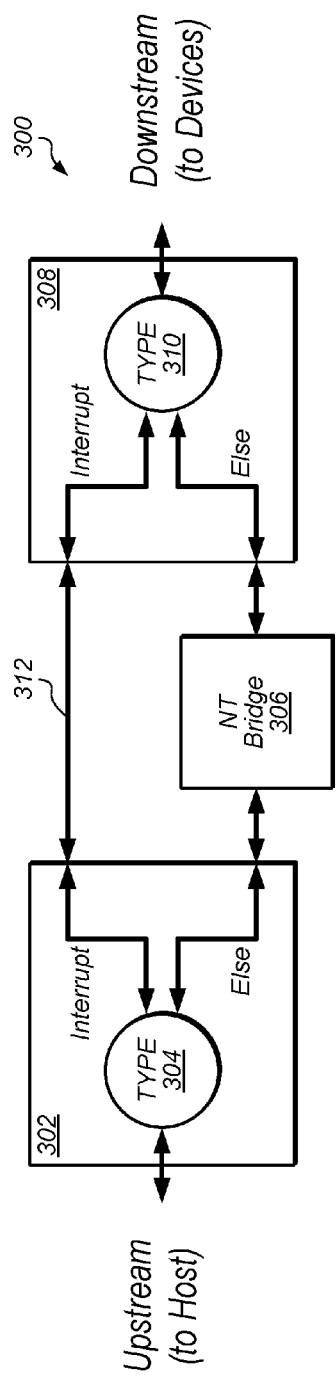
FIG. 3 shows a block diagram of one embodiment of a novel bridge capable of routing PCIe packets according to packet type.

FIG. 3 shows a block diagram of one embodiment of a novel bridge for coupling PCIe subsystems. A conventional NTB 306 may be surrounded by functional blocks 302 and 308, each capable of performing routing functions to facilitate legacy interrupt support for PCI devices in a PCIe switch fabric, while using NTB 306 for PCIe bus expansion. The first functional block 302 is coupled by the upstream side of NTB, while second functional block 308 is coupled by the downstream side of NTB 306. Functional blocks 302 and 308 each include a TLP (Transaction Layer Packet) Type router, 304 and 310, respectively. TLP Type routers 304 and 310 may be operated to route PCI Express packets to one or more alternate output links depending on message type. In this application, TLPs with a Type field of 10xxx (i.e. Message packets) may be routed to an alternate output path 312. More generally, instead of being routed based only on address, PCIe packets may also be routed according to packet type.

The alternate output path is connected to the corresponding link of a matching TLP router 310, where the packet is merged back into the data stream. This provides a path for the interrupt messages to bypass NTB 306. In another set of embodiments, the alternate path 312 coupling TLP Type routers 304 and 310 may not be a direct path, but instead connect to a common processing complex that may perform other functions. One example of such a configuration is provided in FIG. 5, and will be discussed in more detail with respect to a selectively transparent bridge that may be used to couple PCIe bus segments together. In yet another set of embodiments, TLP Type routers 304 and 310 may not be symmetrical, but implement a route function on one side and a merge function on other side, when interrupt messages flow in one direction. For example, in some embodiments, TLP Type router 304 may perform a routing function while TLP Type router 310 may perform a merging function, while in other embodiments TLP Type routers 304 and 310 may each perform both routing and merging functions, depending on the packet type being routed.

Read and write packets may be routed through NTB 306, which handles the discontinuities in the bus numbering (as previously described). Referring again to FIG. 5, in some embodiments, when the host (e.g. host computer 82 in FIG. 1 and/or FIG. 2), configures downstream devices, the configuration cycle may also be redirected to alternate path 520a. That is, a configuration packet may be routed to a configuration block 502, which may include a management/configuration CPU 514, where the configuration packets may be re-written (reconfigured), then routed through path 520b. One example of a packet that may be redirected is a message packet type that implements an interrupt. Overall, NTB 306 doesn't route certain message types. For example, NTB 306 does not route interrupt message packets, configuration packets and/or I/O cycles. Thus, interrupt message packets may be passed through the configuration block 502, while configuration packets may be modified, then routed appropriately by the configuration block 502. Since PCIe packets are routed based on address and not packet type, as prescribed by the PCIe standard, using an improved bridge 300 for routing PCIe packets based on packet type, as shown in FIG. 3 for example, facilitates design of a physical subsystem/configuration to appear to the host as being different than what the physical structure of the subsystem actually is. The host expects a virtual BDF topology, while the physical configuration/topology is different, and thus multiple bus numbers may be hidden from the host, while those addresses that are meant to be visible to the host are mapped into the host's address space. In other words, the HW that is intended to be visible to the host may therefore be mapped.

Figure 7:
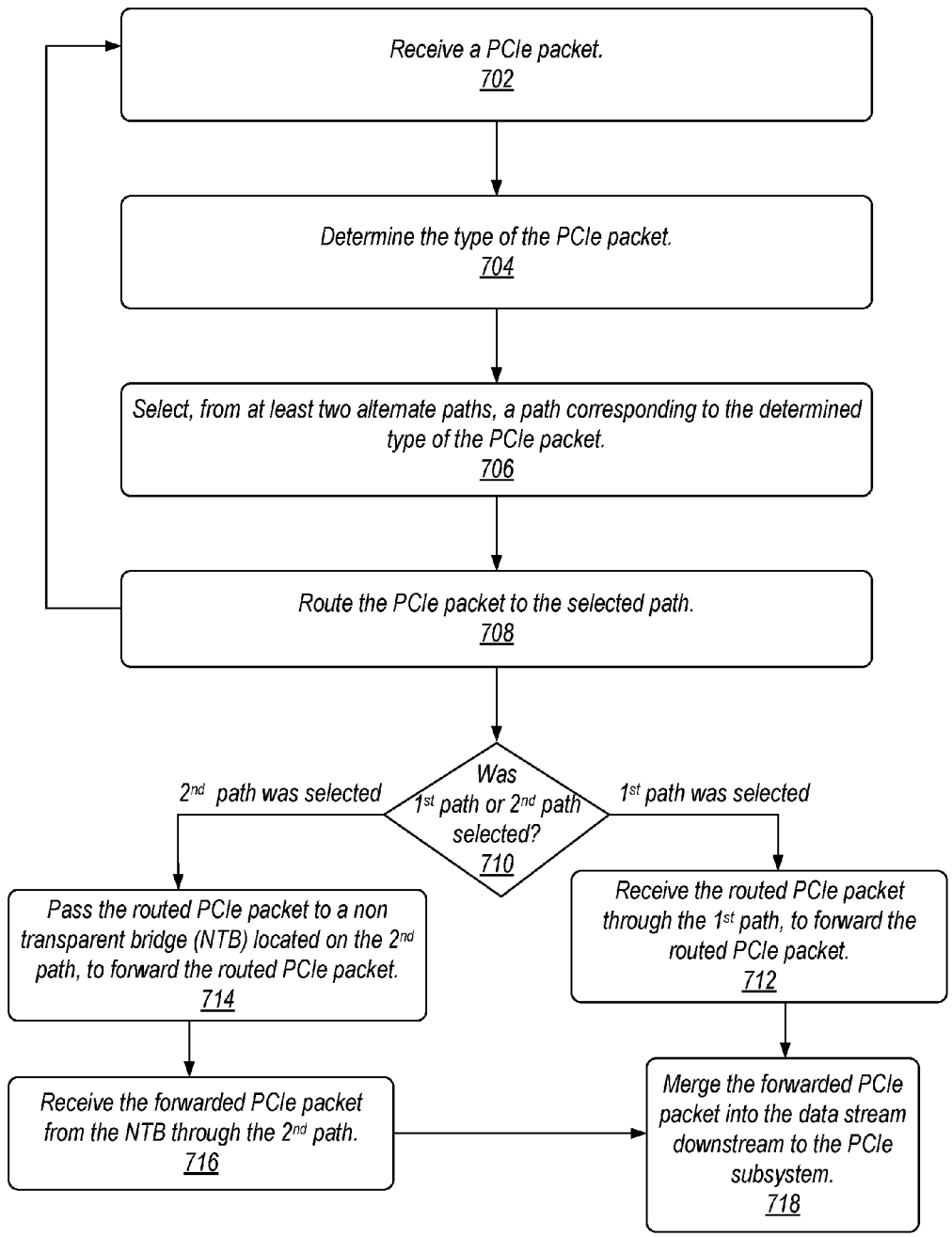
FIG. 7 shows a flow diagram illustrating one embodiment of a method for routing PCIe packets according to packet type.

FIG. 7 shows a flow diagram of one embodiment of a method for transmitting PCIe packets between a host system and a PCIe subsystem. As shown in FIG. 7, the method includes receiving a PCIe packet (702), determining the type of the PCIe packet (704), selecting, from at least two alternate paths, a path corresponding to the determined type of the PCIe packet (706), and routing the PCIe packet to the selected path (708). The PCIe packet may be received from the host system or from the PCIe subsystem. If a first path was selected (as per decision block 710), the routed PCIe packet is received through the first path, to forward the routed PCIe packet (712), and the forwarded packet is then merged into the data stream downstream to the PCIe subsystem (718). If the selected path is a second path (as per decision block 710), the routed PCIe packet is passed to an NTB located along the second path, to forward the PCIe packet (714), after which the forwarded PCIe packet is received from the NTB through the second path (716), and eventually merged into the data stream downstream to the PCIe subsystem (718). In some embodiments, the first path may correspond to message type PCIe packets, configuration type PCIe packets, and/or I/O type PCIe packets, while the second path may correspond to memory type PCIe packets. In such embodiments, the first path provides a pass through path between the host system and the PCIe subsystem, and the second path provides a path through an NTB between the host system and the PCIe subsystem (as indicated by blocks 712 through 718 in FIG. 7). It should also be noted, that while not explicitly shown in FIG. 7, blocks 702 through 716 may represent actions performed in either an upstream direction or a downstream direction for any given PCIe packet. Accordingly, when the PCIe packet is received from the PCIe subsystem, instead of merging the forwarded PCIe packet into the data stream downstream to the PCIe subsystem (718), the merging is into the data stream upstream to the host system.

PCIe Opaque Bridge

A great number of PXI Express chassis solutions may require as many as 26 PCI bus numbers for a single, unpopulated chassis. Larger multi-chassis applications may easily require over 100 continuous bus numbers. Present day PCIe systems increasingly support fewer and fewer bus numbers under the assumption that a 64-bus maximum configuration will become common. These systems sometimes lack the contiguous bus numbers needed to support even a single, large PXI chassis.

In one set of embodiments, a PCI Express bus extender may be designed to have an opaque configuration space and hardware that allows for the decoupling of the host and local PCI Express bus segments. The hardware may facilitate the creation of a new PCIe bus segment that is attached at a host bus endpoint rather than at the root of the host system. Devices attached to the new bus may therefore be supported with existing drivers with little or no change.

Three extensions to conventional PCI Express operation may be adapted in order to create a novel PCIe bus extender. The first extension is a device that implements bus bridging while decoupling bus segments from conventional PCI Express packet routing protocols. This allows the PCI bus hierarchies on each side of the bridge to be independent. The second extension is a mechanism capable of redirecting certain PCI Express packets for additional processing (e.g. the novel bridge 300 shown in FIG. 3). Finally, a method may be devised to implement private PCI configuration.

Figure 4:
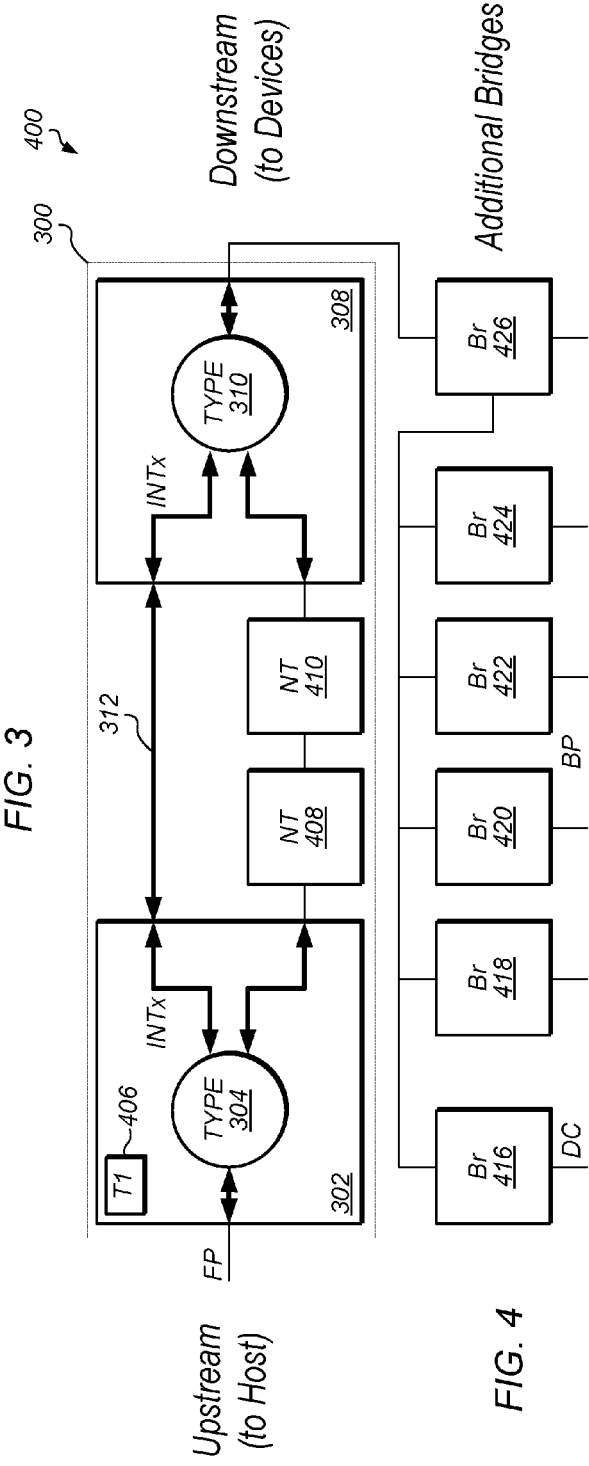
FIG. 4 shows a block diagram of one embodiment of an opaque bridge capable of routing PCIe packets according to packet type.

FIG. 4 shows the block diagram of one implementation of a novel PCIe bus extender, which may include the novel bridge 300 having two TLP Type router functional blocks 302 and 308 surrounding an NT function pair 408/410. A PCI Express bus fanout downstream of the TLP Type router 308 includes bridges 416, 418, 420, 422, 424, and 426. As previously mentioned, TLP Type routers 304 and 310 may operate to route PCI Express packets to one or more alternate output links depending on message type. In one embodiment, TLPs with a Type field of 10xxx (Message packets) are routed to an alternate output path 312. This output path 312 connects the corresponding link of a matching TLP router 310 where the packet is merged back into the data stream. This provides a path for the legacy interrupt messages to bypass the NTB 408/410.

Figure 5:
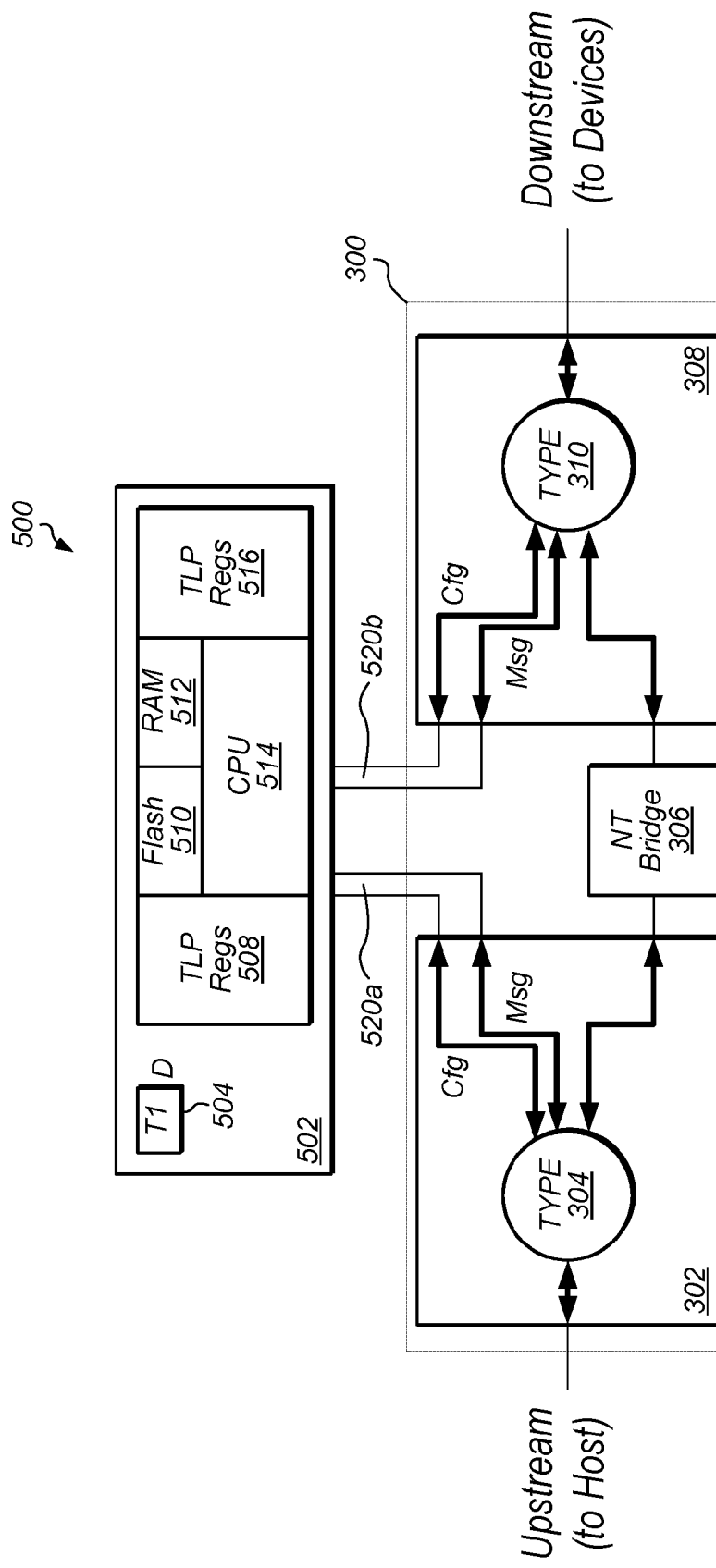
FIG. 5 shows a block diagram of one embodiment of a semi transparent bridge capable of routing PCIe packets according to packet type, and rewriting PCIe configuration packets.

The NTB 408/410 may translate packets as they travel across the isolated PCI Express bus segments. In one embodiment of NTB 408/410, all addresses may be passed through NTB 408/410 without being translated. This would facilitate support for a common address space on both sides of NTB 408/410. Address filtering may be controlled by devices outside NTB 408/410. A type 1 bridge configuration space may be optionally provided by the upstream TLP Type router function 302/304. This configuration space may also be provided by the upstream NT function. A private means of generating PCI configuration requests may be used to configure the subsystem downstream from bridge 300. In one embodiment, that mechanism may be provided by a "punch-through" mechanism of NTB 408/410. It may also be provided by a separate configuration processor (e.g. as shown in FIG. 5, and as will be further detailed below). The actual configuration mechanism may therefore be different from the standard PCI mechanism.

The opaque bridge may be supported by any implementation that provides for PCI bus decoupling and packet redirection. Alternative implementations using NT functions are possible and are contemplated, including a variety of novel switch architectures. Solutions may also be implemented with or without a local processor complex. In one set of embodiments, bridge 300 appears to the host as a bridge to an unknown bus type. The operating system (e.g. in host 82 of system 100 and/or 160) may load a custom device driver that configures the subsystem behind the bridge 300 through its private mechanism. Memory ranges that were preallocated to the bridge 300 may be used to configure memory requirements of I/O devices, and the I/O devices may be exposed to the host as PCI Express devices that otherwise function normally. PCI configuration cycles performed by an I/O device's driver may be intercepted and processed privately by the bridge driver.

As shown in the embodiment of FIG. 4, NT Bridge (function) 306 is split into two modules 408 and 410. More specifically, NTB 306 is implemented as two back-to-back NT functions 408 and 410. As mentioned above, devices may be implemented to look to the host (upstream) like a bridge to a different kind of bus than a PCI bus. That is, bridge 300 doesn't appear to the host as a PCI bridge, it appears to the host as a bridge to a proprietary bus. In other words, bridge 300 may look to the host like an endpoint. When configuring bridge 300, the host may acknowledge a number of registers requesting resources that are to be used to map in an alien bus that the host otherwise doesn't recognise at all. The bridge 300 is therefore opaque. The configuration of the downstream portion may be unknown to the host, which may only be aware of the fact that certain resources are being requested. T1 406 is a register file (e.g. a configuration space register—CSR) that may include a listing of resources required for the subsystem downstream to be attached to the system by the host. As mentioned before, an example of a host is computer 82 in systems 100 and/or 160.

The host may then allocate resources for the subsystem presented/described in the register file 406, and the NT bridge functions 408/410 may have private configuration mechanisms. Because the subsystem does not appear as a PCI standard but instead appears as a proprietary bus to the host, the host processor is unaware of the resources (described in register file 406) during system boot up, though those physical resources are present. The OS (operating system) may load and execute a proprietary device driver in support of the proprietary bus type. Therefore, while the downstream devices are in fact PCIe devices, the host doesn't acknowledge them as PCIe devices. At the same time, since the devices are PCIe devices, they may already have device drivers written for them.

Therefore, the BIOS in the host system may first be informed that the devices to be coupled are not PCIe devices, and certain amount of memory is required for these devices. The BIOS may therefore not attempt to configure the devices, but may instead allocate the required memory space. In addition, when the OS boots, it too may not attempt to configure the devices. Instead, it may be instructed to load the proprietary driver instead of any existing PCI drivers to configure the bus. Thus, the proprietary driver may be loaded, and it may configure the devices, then inform the OS that there are PCIe devices in the system at the specified addresses, which may cause the OS to load and execute the existing PCIe device drivers to operate/use the devices. The proprietary driver may also be used to handle traffic between the PCIe drivers and the OS. Therefore, the devices may still operate as PCIe devices on the PCIe bus, but from the perspective of the OS (host), they operate as devices on a proprietary bus. Thus, in at least one set of embodiments, bridge 300 may be operated by executing a proprietary bus driver in the BIOS and OS while configuring the system, instead of using PCI bus drivers, while still using the existing device drivers of the PCIe devices to operate those devices during runtime. Furthermore, the proprietary device driver may also act as an interface between the device drivers and the OS.

Figure 8:
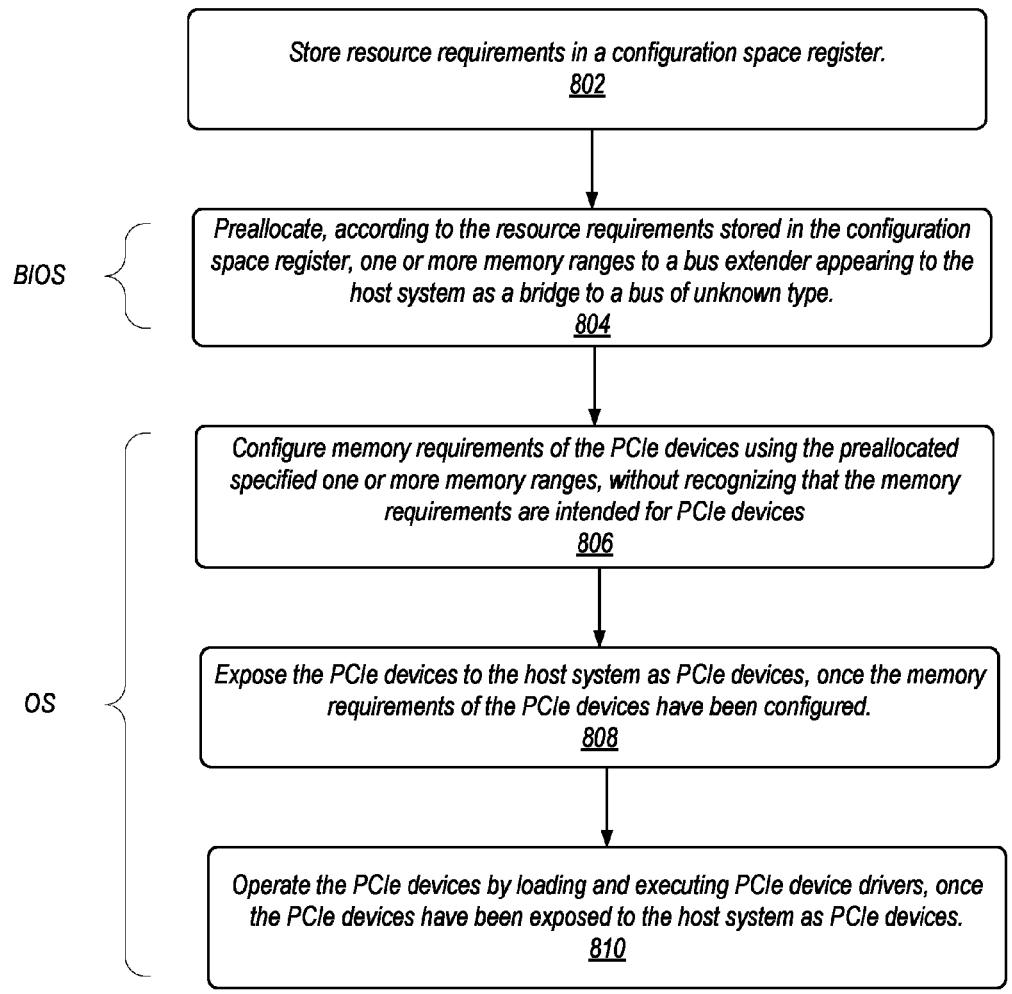
FIG. 8 shows a flow diagram illustrating one embodiment of a method for configuring and operating PCIe devices in a PCIe subsystem coupled to a host system.

FIG. 8 shows a flow diagram of one embodiment of configuring a PCIe subsystem using an opaque bus extender (or opaque bridge) and proprietary driver software, in order to bypass bus numbering limitations inherent in the PCIe bus protocol. The PCIe subsystem may include PCIe devices to be coupled to a host system, and at least partially operated by the host system. As shown in FIG. 8, resource requirements (associated with the PCIe subsystem) are stored in a configuration space register (CSR) that may be located in a specified part of the system (802). Specified one or more memory ranges may be preallocated, according to the resource requirements stored in the CSR, to a bus extender appearing to the host system as a bridge to a bus of unknown type (804). In one set of embodiments, the bus extender may actually write the resource requirements into the CSR, and the CSR may itself be located in the bus extender. The preallocation of the memory ranges (804) may be performed by a BIOS executed by the host system upon the host system coming out of reset, for example, after the CSR has been written. Once the specified memory ranges have been preallocated, memory requirements of the PCIe devices may be configured using the preallocated memory ranges, without recognizing that the memory requirements are intended for PCIe devices (806). This (i.e. 806) may be performed by the OS loading and executing driver software corresponding to a non-PCI bus protocol. The PCIe devices may then be exposed to the host system as PCIe devices, once the memory requirements of the PCIe devices have been configured (808). Once the PCIe devices have been exposed to the host system as PCIe devices, the PCIe devices may be operated by loading and executing PCIe and/or PCI device drivers (810). As shown in FIG. 8, 806 through 810 may be performed while booting/running the OS, while at least 804 may be performed while booting the BIOS after reset.

PCIe Selectively Transparent Bridge

As previously mentioned, a PCI Express bridge 300 may be used to present a virtual bus view to the host that hides certain PCI Express components from the host, and flattens the bus structure to reduce host resource demands. As described above with respect to FIG. 4, a proprietary driver (bus driver SW)—instead of a PCI driver—may be executed for the BIOS and the OS of a host system, to enable bridge 300 to hide certain desired PCIe components from the host. Devices attached to the host through bridge 300 may however function without change. In one set of embodiments, a selectively transparent bridge may be used to restore the historical bus topology of PCI in an Express system, thereby increasing system compatibility. In these embodiments, rather than executing a proprietary bus driver as described above with respect to FIG. 4, a configuration block 502 may be used to rewrite rerouted configuration packets, as shown in FIG. 5.

Thus, two extensions to conventional PCI Express operation may be used to perform the desired subsystem configuration. The first extension may include a device that implements bus bridging while decoupling bus segments from conventional PCI Express packet routing protocols. The second extension may include a mechanism to redirect certain PCI Express packets for additional processing. Finally, a local processor complex may be used. One embodiment of such a solution 500 is shown in FIG. 5. A selectively transparent bridge system 500 may include an improved bridge 300, also shown in FIGS. 3 and 4. Bridge 300 may again include a conventional NT function 306 used to provide isolation of the PCI bus segments. The NTB 306 translates packets as they travel across the isolated PCI Express bus segments. In one set of embodiments, all addresses are passed through NTB 306, and no addresses are translated, which provides support for a common address space on both sides of bridge 300. Address filtering may be controlled by devices outside NTB 306.

Packet routing may again be accomplished by two TLP Type router functional blocks 302 and 308, each including a respective TLP Type router (304 and 310, respectively). The TLP Type routers 304 and 310 may route PCI Express packets to one or more alternate output links depending on message type. For example, TLPs with a Type field of 10xxx (i.e. message packets) may routed to an alternate output path 520a. In addition, TLPs with a Type value of 001xx (i.e.

configuration packets) may also be routed to alternate output path 520a. While in FIG. 5 each of these packet types is shown routed to a respective individual port (message packets to port "Msg" and configuration packets to port "Cfg"), in alternate embodiments the packet types could be routed on a combined, individual port. In any case, based on the packet type, certain packets (in this case message packets and configuration packets) may be routed to alternate path 520a, to reach configuration block 502.

As shown in FIG. 5, the alternate output ports from the TLP Type routers 304/310 are connected to a configuration block 502, which may include various internal components, for example a CSR 504, TLP registers 508/516, flash memory 510, RAM (random access memory) 512, and a CPU 514. Message packets are relayed through the configuration processor 514 to provide a path for the legacy interrupt messages to bypass NTB 306. The configuration CPU 514 may respond to upstream configuration packets and initiate downstream configuration packets corresponding (or according) to the upstream configuration packets, and may also implement a bridge CSR for the subsystem. It should be noted that "upstream configuration packets" refers to configuration packets received from a source upstream from CPU 514, in this case from the host system, and "downstream configuration packets" refers to configuration packets transmitted downstream from CPU 514, in this case to the PCIe subsystem/PCIe devices. In some embodiments, TLP Type router function block 302 may also implement the bridge CSR. Any implementation that provides for PCI bus decoupling and packet redirection is capable of supporting bridge system 500. Alternative implementations using NT functions are also possible and are contemplated, and a novel switch architecture may also be adapted to offer these capabilities.

Selectively transparent bridge 500 facilitates a PCI device presenting itself to the host as a PCI-to-PCI bridge but selectively hiding and isolating hardware from the host bus. PCI configuration may be achieved through the standard PCI Express configuration mechanisms (unlike for the opaque bridge 400 shown in FIG. 4, which employs a proprietary bus driver in the BIOS and OS), but instead of the host configuring the PCIe devices directly, the configuration processor 514 intercepts the configuration packets from the host, and creates a virtual configuration to alter the apparent bus topology. In other words, processor 514 may create a virtual configuration apparent to the host system upstream, and corresponding to the physical configuration apparent to processor 514 downstream. Devices are selectively hidden and managed by the configuration processor 514, resulting in simplified complexity and bus depth. Since selectively transparent bridge 500 appears to the host as a transparent bridge, no special drivers or resource preallocations are required, although the selectively transparent bridge fully supports special drivers and/or resource preallocations. Devices located/connected downstream of the bridge 300 may therefore function with unmodified drivers.

Because the configuration shown in FIG. 5 does not include the proprietary driver discussed with respect to opaque bridge 400, a PCI-to-PCI bridge is indicated to the host, and the host does generate configuration packets for configuring the PCIe devices. In other words, because the host considers the devices that are to be configured to be PCIe devices, a standard BIOS and driver stack may be used during operation, but the configuration packets generated by the host are intercepted before reaching their intended recipients, and a virtual topology may be created based on the actual physical topology present in the subsystem downstream from bridge 300. The host is aware of the virtual topology, which is a subset of the actual (physical) topology, with most of the buses removed. Thus, what the host is "aware of" is different from what is actually present in the system. The overall bridge 500 still appears as a PCI-to-PCI bridge, but configuration packets are routed to configuration CPU 514. The configuration unit 502 translates the target BDFs, i.e. it converts the virtual topology into the corresponding physical topology (for the downstream devices), and handles all additional tasks necessary to program the HW "hidden" from the OS/host/system. That is why configuration packets are also redirected to configuration unit 502.

Figure 9:
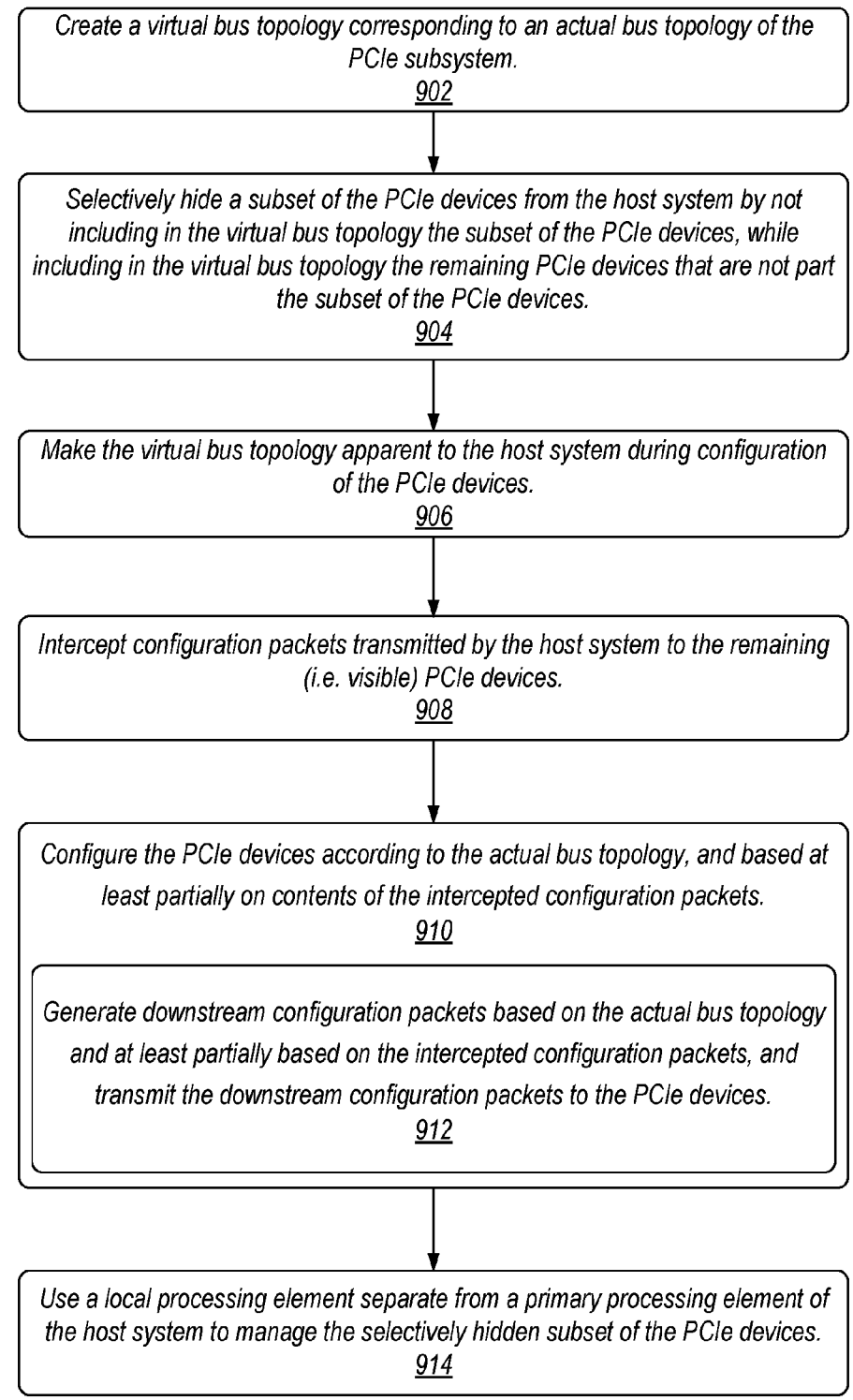
FIG. 9 shows a flow diagram illustrating another embodiment of a method for configuring and operating PCIe devices in a PCIe subsystem coupled to a host system.

FIG. 9 shows the flow diagram of a method—based at least partially on the embodiments described above—for configuring and operating PCIe devices in a PCIe subsystem coupled to a host system. As shown in FIG. 9, a virtual bus topology corresponding to an actual bus topology of the PCIe subsystem may be created (902), and a subset of the PCIe devices may be selectively hidden from the host system by not including in the virtual bus topology the subset of the PCIe devices, while including in the virtual bus topology the remaining PCIe devices not included in the subset of the PCIe devices (904). The virtual bus topology is then made apparent to the host system during configuration of the PCIe devices (906). As a result, instead of attempting to configure all the PCIe devices in the actual bus topology, the host attempts to configure only the PCIe devices included in the virtual bus topology. Accordingly, configuration packets transmitted by the host system to the remaining PCIe devices (that is, to the PCIe devices included in the virtual topology and hence visible to the host) are intercepted (908).

The PCIe devices may then be configured according to the actual bus topology, and based at least partially on contents of the intercepted configuration packets (910). As also shown in the flow diagram of FIG. 9, the PCIe devices are configured by generating downstream configuration packets based on the actual bus topology and at least partially based on the intercepted configuration packets, and transmitting the downstream configuration packets to the PCIe devices (912). A local processing element separate from a primary processing element of the host system may be used to manage the selectively hidden subset of the PCIe devices (914), allowing the devices to remain hidden from the host while still operating properly. Though not shown in FIG. 9, some embodiments may further include relaying message type PCIe packets through the local processing element to provide a path for legacy interrupt messages. Furthermore, the virtual bus topology may be converted into the actual bus topology, for example by the local processing element, by translating target BDFs (bus, device, function), and performing additional tasks to program the selectively hidden subset of the PCIe devices. Also, the host may generate configuration packets according to resource request information stored in a configuration space register, the content of which may also be written by the local processing element.

Hidden BAR Programming in PCIe

As previously mentioned, PCI Express is an I/O bus that retains the communications and programming models of PCI, but implements a serial point-to-point hardware topology. As also previously mentioned, due to the details of this bus emulation, PCI Express systems oftentimes consume many more PCI bus numbers than originally anticipated in the PCI standard. In most cases, the extra bus numbers don't present a problem, but there are cases where it is necessary to hide some of the PCI Express bridges in order to preserve bus numbers. An inherent problem with hiding a bridge is the lack of means to ensure that memory resources are assigned in a manner compatible with the bridges of which the host is not aware.

As previously described, bridges and endpoints are two types of devices in PCI. A bridge typically refers to a PCI-to-PCI bridge, however, bridges to non-PCI busses also exist. The two primary types of CSRs (configuration space registers) used in PCI are bridge CSRs (associated with PCI-to-PCI bridge), and endpoint CSRs. These CSR are typically referred to as type 0 (endpoint) and type 1 (PCI-to-PCI bridge) CSRs. An endpoint usually requests resources, and a bridge is expected to pass through all accesses to the endpoint resources. Endpoints are configured with registers describing the resources that the endpoints use. Bridges also contain those registers, and also include additional registers referred to as "forwarding registers", which describe the resource ranges that are configured downstream. All downstream resources have a corresponding "rolled up" cumulative address range, which is expected to be described in the forwarding registers, thus achieving address routing of the packets.

Resources downstream are assigned contiguously, so that when they are "rolled up" they all fit in a single address range. As mentioned above, a type 1 CSR for a bridge differs from an endpoint CSR in that the bridge also includes forwarding registers. In PCI terminology a "resource register" is referred to as a BAR (base address register). There are typically six BARs in an endpoint and two BARs in a bridge. A BAR is usually a 32-bit register, and conveys the base address of the resource, as well as how big the resource is. To determine the size required by the resource, all F's may be written to the BAR, and the value may be read back. The read back value typically does not contain all F's. By convention, the bits are returned in a specific manner, and from the returned value, the size of the resource may be calculated. BARs have distinct sizes, more specifically, sizes that are powers of 2. For example, a BAR cannot be 384K, but a 128K BAR or a 256K BAR is possible. This limitation may pose a problem under certain circumstances.

Bridge forwarding ranges do not have power of 2 size limitations, i.e. the forwarding range is not necessarily expected to be a power of 2, but they are expected to have a 1 MB minimum size limitation for memory. When attempting to "hide" bus numbers and/or bridges from the host, the endpoint is indicated as being attached to the bus (when in fact it is not directly attached to the bus, as will be further discussed below with respect to FIG. 6), effectively hiding any intermediate bridges from the host. Thus, the host may remain agnostic about the forwarding ranges of those hidden bridges. However, those forwarding ranges are expected to be properly programmed. That is, the host is expected to program the BAR in a manner that also allows for programming the forwarding registers hidden to the host, to ensure that the address routing works as intended.

Figure 6:
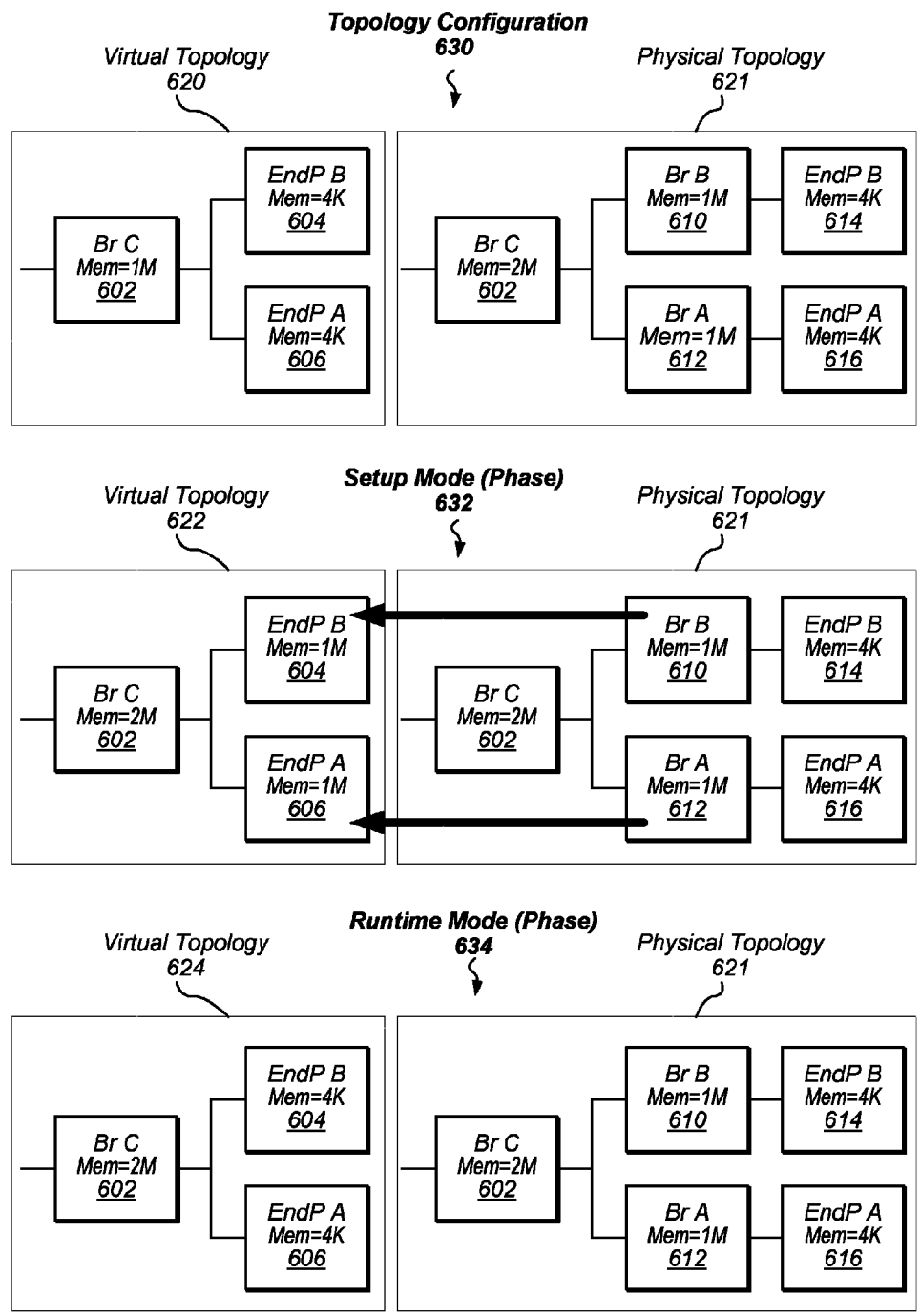
FIG. 6 shows a block diagram of a PCIe physical topology represented as a virtual topology to a host.

In one set of embodiments, a PCI bridge hiding mechanism may ensure that hidden bridges are always programmed correctly without host software being aware of the hidden devices. In order to achieve this, a mapping and correspondence may be established between a virtual topology and a physical topology, whereby the host is presented with the virtual topology as opposed to the actual physical topology. FIG. 6 shows a topology configuration 630, which includes a physical topology 621 and a corresponding virtual topology 620. In various embodiments, the host may be presented by virtual topology 620 instead of the actual physical topology 621. More specifically, bridges A and B (612 and 610, respectively) may be hidden to the host. PCI endpoints may allocate small memory regions (e.g. 4K) whereas bridges may allocate a minimum of 1 MB regions. In addition, bridges and endpoints have different memory alignment rules. As shown in FIG. 6, two endpoints A and B may each request 4 KB of memory. As shown in FIG. 6, endpoint A 616 from the (actual) physical topology 621 is represented as endpoint 606 in virtual topology 620 (seen by the host), whereas endpoint B 614 from the (actual) physical topology 621 is represented as endpoint 604 in virtual topology 620.

The hidden bridges 610 and 612 above them expand those sizes to 1 MB each, which results in the top level bridge having to allocate 2 MB of total memory. Since the first level bridges 610 and 612 are hidden from the host, the host CPU may determine that it need only allocate 1 MB to the top level bridge 602, and may place the endpoint allocations adjacent to one another. Therefore, it may not be possible to program the hidden bridges to operate correctly. Small memory regions are one of a number of different circumstances under which hidden bridges may cause configuration failure.

In one set of embodiments, a proxy configuration processor (e.g. configuration CPU 514 in FIG. 5) may implement separate phases for bus setup and runtime, in addition to supporting the hiding of bridges. Exiting reset, the proxy processor may enter a setup phase 632, where it may scan its local bus tree and identify devices that are targeted for hiding. The proxy processor may then determine the resource requirements needed for each device in the subsystem (downstream), and may create a virtual topology 622. As illustrated in FIG. 6, the virtual topology 622 now presents different memory requirements for endpoints 604 and 606 than in virtual topology 620 for the topology configuration 620. Therefore, rather than presenting the resource requirements for the visible devices (614 appearing as 604, and 616 appearing as 606 in virtual topologies 620, 622, and 624), the proxy processor may present modified requirements that take into account the needs of the hidden bridges (610 and 612). With reference to FIG. 5, instructions for CPU 514 to execute may be stored in flash memory 510, or may be loaded into RAM 512.

Thus, in setup mode 632, the actual physical HW requirement of 4K for endpoints 614 and 616 is not communicated to the host, but instead a higher number (in this case 1M) is provided, which may be used by the BIOS to perform its setup. Once configuration by the BIOS is complete, the proxy processor may switch to a runtime mode 634, where the virtual topology 624 is also configured with the actual HW requirement range, as will be further discussed below. In setup mode 632, the BAR requests made by the endpoints 604 and 606 are not the physical BARs the endpoints 614 and 616 provide, but are instead rollup allocations that the hidden bridges 610 and 612 above endpoints 614 and 616, respectively, are expecting. In the event of multiple endpoint BARs of a given type, or of a multifunction endpoint, all allocations may be summed, and one BAR of that type may be requested. Writes to these BAR registers may actually be directed at the hidden bridges 610 and 612, and may be distributed to the hardware BARs transparently later. The host is not expected to see the actual endpoint BARs 614 and 616. It should also be noted that the topologies in FIG. 6 are intended to provide example embodiments, and alternate embodiments may contain more endpoints and/or bridges and/or hidden bridges, and different fanout combinations of bridges and endpoints. As mentioned above, allocations in the virtual topology may be made based on the rolled up numbers provided by the proxy configuration CPU (e.g. CPU 514 in FIG. 5) for the representative endpoints within the virtual topology.

As the host programs each device, it may accumulate BAR information that ensures that upstream bridge programming is correct. Once the subsystem is set up, a switch to runtime mode 634 may take place. Runtime mode 634 for the same original topology configuration 620 is also illustrated in FIG. 6. In runtime mode 634, the actual BARs of endpoints 614 and 616 are exposed to the host, indicated by endpoints 604 and 606 each indicating the respective actual BAR values of corresponding physical endpoints 614 and 616. Since the BIOS may only be responsible for configuration of the devices and not their use, the changing of the apparent registers does not present an issue.

Transition from setup phase 632 to runtime 634 phase may be triggered manually or automatically. In the case of automatic triggering, the host writing to top level bridge 602 may trigger the transition. Such writes may occur to either the subordinate bus number register or to a combination of updates to the resource forwarding registers. Determination of when to transition from setup mode to runtime mode may be made based on heuristics, for example. The bridge registers may be examined and/or tracked. When all the bridge registers have been programmed, indicating that the endpoints have been programmed, switching from setup phase (mode) 632 to runtime phase (mode) 634 may take place. The transition may be verified at each bridge register.

In one sense, the information requesting resources to be allocated that is programmed into the CSR (e.g. T1 406 or T1 504) may be interpreted as corresponding to a "configuration block" with the information changing from setup phase 632 to run phase 634. This configuration block may be localized to a single endpoint and associated bridges, or it may contain a more complex downstream configuration, up to and including the entire subsystem. Accordingly, the configuration block mechanism may be used for the entire subsystem as a form of intelligent "device hiding". In other words, the configuration block may be used for entire subsystems as a means for improving system compatibility. Therefore, the configuration block may incorporate just a single endpoint and its corresponding intermediary bridges, or it may incorporate a large hierarchy. Furthermore, the virtual topology presented to the host during the setup phase 632 may therefore remain different from the actual physical topology 621 during runtime 634 (as shown in FIG. 6), while in some embodiments it may also be the same as the physical topology 621 during runtime 634. In other words, in some embodiments during runtime phase 634, virtual topology 624 may not be different from physical topology 621.

Figure 10:
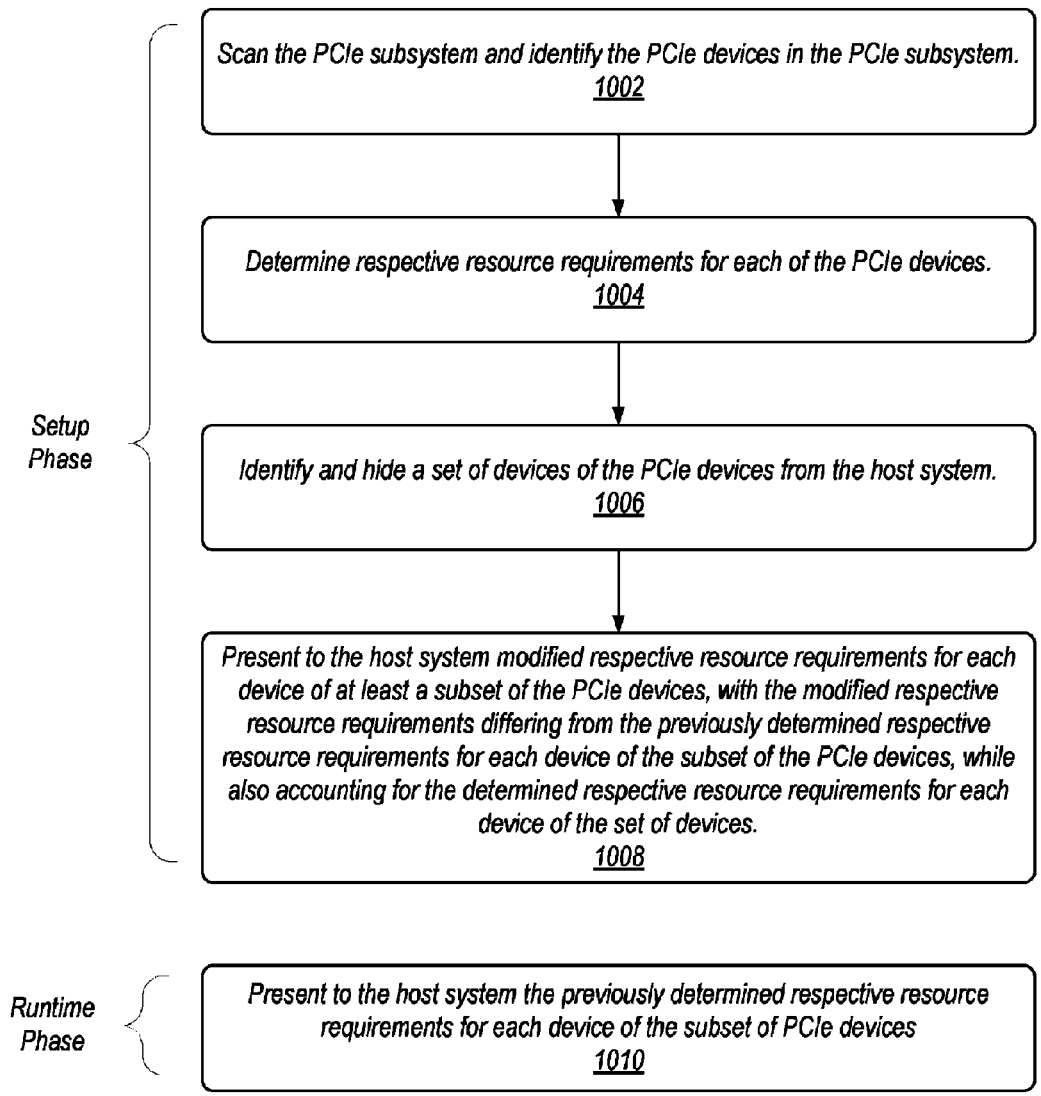
FIG. 10 shows a flow diagram illustrating one embodiment of a method for programming BAR registers hidden from a host system.

FIG. 10 shows a flow diagram of a method for configuring a PCIe subsystem to be connected to a host, according to at least the embodiments described above. The PCIe subsystem may include PCIe devices that are intended to be configured, which includes the host system writing the BARs of the PCIe devices according to the desired configuration. The method includes a setup phase and a runtime phase as shown in FIG. 10. During the setup phase, the PCIe subsystem is scanned to identify the PCIe devices (1002), and the respective resource requirements for each of the PCIe devices is determined (1004). A set of devices (of the identified PCIe devices) is then identified and hidden from the host system (1006). The host system is then presented with modified respective resource requirements for each device of at least a subset of the PCIe devices, with the modified respective resource requirements differing from the previously determined respective resource requirements for each device of the subset of the PCIe devices (1008). The modified respective resource requirements also account for the determined respective resource requirements for each device of the set of devices that have been hidden from the host, to ensure that the appropriate amount of resources are allocated. Once the setup phase has concluded, a runtime phase is executed, during which the host system is presented with the previously determined resource requirements for each device of the subset of PCIe devices (1010).

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system comprising:
   a switch fabric subsystem comprising first devices expected to operate according to a first bus protocol associated with the switch fabric subsystem; and
   a host coupled to the switch fabric subsystem, and configured to:
      during setup of the switch fabric subsystem, load custom driver software (SW) corresponding to a second bus protocol not associated with the switch fabric subsystem, and configure the first devices according to the custom driver SW instead of configuring the first devices according to a bus driver corresponding to the first bus protocol; and
      subsequent to the setup of the switch fabric subsystem, load existing device drivers to operate the first devices, wherein the existing device drivers correspond to the first bus protocol.

2. The system of claim 1, wherein during setup of the switch fabric subsystem, the host is configured to:
   execute a BIOS (basic input/output system), wherein the BIOS is informed that the first devices to be coupled to the host are not devices operating according to the first bus protocol, and is further informed how much memory is required by the first devices to be coupled; and
   in executing the BIOS, allocate the required memory to the first devices.

3. The system of claim 1, wherein the host is configured to execute an OS (operating system), and load the custom driver SW while executing the OS.

4. The system of claim 1, further comprising a bus extender that couples the switch fabric subsystem to the host;
   wherein the bus extender appears to the host as a bridge to a bus of unknown type.

5. The system of claim 4, wherein the host is further configured to:
   prior to loading the custom driver SW, preallocate specified one or more memory ranges to the bus extender.

6. The system of claim 5, wherein the bus extender comprises a configuration space register configured to store a list of resource requests intended for the host;
> wherein the host is further configured to preallocate the specified one or more memory ranges to the bus extender according to the list of resource requests stored in the configuration space register.

7. The system of claim 5, wherein when configuring the first devices according to the custom driver SW, the host uses the preallocated specified one or more memory ranges to configure memory requirements for the first devices.

8. A system comprising:
a processing element; and
a memory configured to store:
> first driver software corresponding to a first bus protocol and executable by the processing element during setup of a switch fabric subsystem that comprises first devices to be coupled to a host system, wherein the first bus protocol is not associated with the switch fabric subsystem; and
> second device driver software executable by the processing element subsequent to the setup of the switch fabric subsystem, wherein the second device driver software corresponds to a second bus protocol associated with the switch fabric subsystem;

wherein the processing element is configured to:
> execute the first driver software to configure the first devices; and
> execute the second driver software to operate the first devices.

9. The system of claim 8, wherein the processing element and the memory are comprised in the host system.

10. The system of claim 8, wherein the memory is further configured to store:
> basic input/output system (BIOS) software executable by the processing element during the setup of the switch fabric subsystem;
> wherein the processing element is configured to execute the BIOS software prior to executing the first driver software to preallocate specified resources associated with the switch fabric subsystem.

11. The system of claim 10, wherein the processing element is further configured to execute the first driver software to use the preallocated specified resources to configure memory requirements for the first devices.

12. The system of claim 10, further comprising:
a bus extender configured to couple the switch fabric subsystem to the host system;
wherein the bus extender appears to the processing element as a bridge to a bus of unknown type.

13. The system of claim 10, wherein the bus extender comprises a configuration space register configured to store a list of resource requests intended for the processing element;
> wherein the processing element is further configured to execute the BIOS software prior to executing the first driver software to preallocate the specified resources to the bus extender according to the list of resource requests stored in the configuration space register.

14. A method for configuring and operating first devices comprised in a switch fabric subsystem coupled to a host system, the method comprising:
> preallocating specified one or more memory ranges to a bus extender appearing to the host system as a bridge to a bus of unknown type;
> configuring memory requirements of the first devices, said configuring comprising:
>> using the preallocated specified one or more memory ranges; and
>> configuring the memory requirements without recognizing that the memory requirements are intended for devices operating according to a first bus protocol associated with the switch fabric subsystem.

15. The method of claim 14, further comprising:
exposing the first devices to the host system as devices operating according to the first bus protocol, subsequent to said configuring the memory requirements of the first devices.

16. The method of claim 14, wherein said preallocating is performed according to resource requirements stored in a configuration space register.

17. The method of claim 16, further comprising:
writing, by the bus extender, the resource requirements into the configuration space register.

18. The method of claim 14, wherein said preallocating is performed by executing a basic input/output system (BIOS).

19. The method of claim 14, wherein said configuring the memory requirements of the first devices is performed by loading driver software by an operating system;
> wherein the driver software corresponds to a second bus protocol not associated with the switch fabric subsystem.

20. The method of claim 14, further comprising operating the first devices by loading and executing first device drivers, subsequent to said preallocating and said configuring the memory requirements of the first devices, wherein the first device drivers correspond to the first bus protocol.

* * * * *